D. M. MEFFORD.

Preserving Fruits.

No. 8,229. Reissued May 14, 1878.

Attest:
H. L. Penne
J. A. Rutherford

Inventor:
David M. Mefford.
By A. L. Coombs, Atty

UNITED STATES PATENT OFFICE.

DAVID M. MEFFORD, OF TOLEDO, OHIO.

IMPROVEMENT IN PRESERVING FRUITS.

Specification forming part of Letters Patent No. 82,429, dated September 22, 1868; Reissue No. 8,229, dated May 14, 1878; application filed May 2, 1878.

*To all whom it may concern:*

Be it known that I, DAVID M. MEFFORD, of Toledo, in the county of Lucas and State of Ohio, formerly of Norwalk, in the county of Huron, in said State, have invented a new and useful process of treating fruit for the preservation thereof, of which the following is a specification:

This process consists, first, in subjecting fruit, such as apples, pears, peaches, apricots, nectarines, plums, prunes, grapes, and the various kinds of berries, in their raw or uncooked condition to the action of free sulphurous-acid gas, in order to prevent oxidation and fermentation; and, secondly, in heating the fruit thus treated to eliminate any excess of sulphurous-acid gas which may have been combined with it.

A description of an apparatus which may be used for thus treating the fruit is as follows, reference being had to the accompanying drawings, in which—

Figure 2:
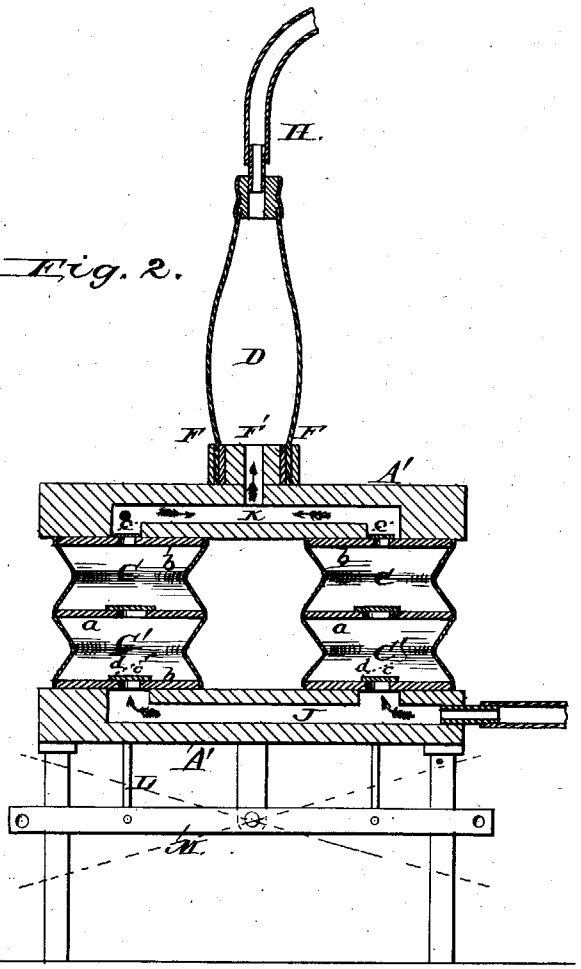
Figure 1:
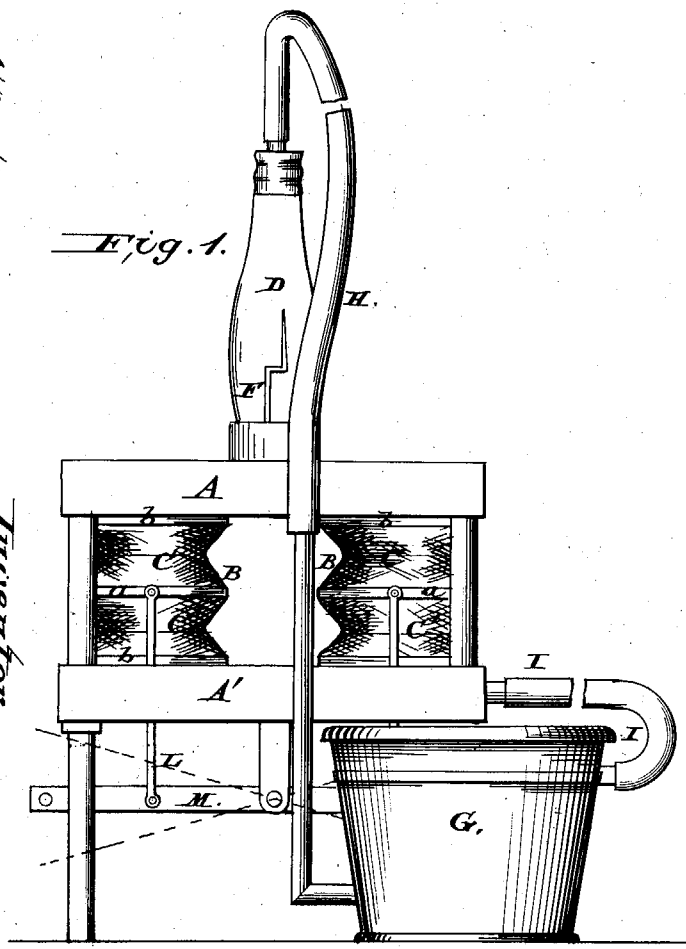

Figure 1 is a side view of the apparatus, and Fig. 2 is a vertical section thereof.

A and A′ represent an upper and lower table, arranged as shown. B B are the bellows or air-pumps, which are made in two sections, C C′, the same being separated by a diaphragm, *a*. In this diaphragm, and also in the upper and lower heads *b b*, are the valves *c*, all opening upward, as indicated by the dotted lines *d*, which are for a purpose hereinafter shown. D represents a chamber in which is fixed the hook E. This chamber is designed to fit firmly over the gasket F on the tube F′, which is secured to the table A. Leading from this chamber to the lower part of the vessel G is the tube or hose H, and from the upper part of the vessel G is the hose I, leading to the lower table A′. In this table is the conduit J, with which this hose connects. In the upper table A′ is a similar conduit, K, connecting with the chamber D.

The manner in which this apparatus is used is as follows: A wick of any flocculent material may be prepared by charging or saturating it with sulphur. It is then hung on the hook E and ignited, the fruit having been previously prepared and placed in the vessel G in its raw condition. This vessel is provided with a close cover, and is perfectly tight. The bellows B are worked by means of the rod L and lever M, and kept in constant motion, so that a perfect circulation may be kept up. By burning the sulphur wick sulphurous-acid gas is produced, and the current from the bellows carries this into the hose H, and thence into the vessel G, where it permeates the fluid. After it has passed through the fruit it enters the tube I at the top of the vessel, and thence into the conduit J, where it is drawn by the alternate action of the bellows into the section C. The valves all opening upward will close and prevent any of the gas passing back, but a complete and continuous circulation is established throughout the whole apparatus, thoroughly permeating the fruit contained in the vessel.

The peculiar effect of subjecting the fruit to the action of the gas is, that it bleaches or whitens it, and prevents it from turning brown or dark colored by the oxidizing influence of the air upon it, and it also preserves, in a high degree, its natural flavor, causing it to retain the flavor of fresh fruit. Even after cut fruit has, by exposure to the atmosphere, become partially oxidized and turned brown, this treatment will bleach and restore it to its original color.

After being impregnated with the gas the fruit should be subjected to artificial heat to drive off any excess of sulphurous-acid gas that may have combined with it; but the degree of heat, or the length of time of subjecting the fruit thereto, should not be such as to cook it or materially soften its tissues. This heating eliminates all the gas that is not incorporated with the properties of the fruit, thus preventing any gaseous sulphurous taste, and the acid incorporated with the fruit is merged in its acid.

The length of time required for properly impregnating the fruit will depend upon the intensity of the gas in the treating-chamber, the quantity of fruit under treatment, and whether it lies open and loose, affording easy access of the gas among its interstices, or more compactly massed together. It also depends very much upon the kind of fruit under treatment, and the manner in which it is cut or prepared. Apples, peaches, pears, and the like, if cut very thin and the pieces fully exposed, may become sufficiently impregnated in a minute of time, whereas, if cut in halves or quarters, they will require from five to fifteen minutes; but plums, gooseberries, and grapes, with their skins entire and unbroken, will require from thirty minutes to an hour or more.

Fruit treated in this manner need not be sealed in order to be kept, but will remain without decomposing in open vessels or receptacles.

This method of treating fruit admits of various modifications in the apparatus other than that herein described, such as burning sulphur in a box, chamber, or tower, wherein fruit is placed in such manner as to be accessible to the sulphurous-acid gas produced by the combustion of the sulphur, or by burning the sulphur in a separate chamber communicating with that containing the fruit, and conducting or forcing the gas into the treating-chamber.

I am aware that patents have been granted for preserving meats, fish, and vegetables by immersing them in solutions of sulphites, such as the sulphite of lime, soda, &c., and for preserving said substances by treating them with sulphurous-acid gas in combination with other chemical antiseptic agents, and these processes I do not claim; but

What I claim, and desire to secure by Letters Patent, is—

The method or process of preserving fruit by treating or charging the same in a raw state with free sulphurous-acid gas uncombined with any other chemical antiseptic agent, and then subjecting it to heat, in the manner substantially as set forth.

DAVID M. MEFFORD.

Witnesses:

J. W. HAMILTON JOHNSON,

FLOYD NORRIS.